United States Patent
Biswas et al.

(10) Patent No.: US 11,631,173 B2
(45) Date of Patent: Apr. 18, 2023

(54) PATTERN RECOGNITION BY CONVOLUTIONAL NEURAL NETWORKS

(71) Applicants: Abhishek Biswas, Kolkata (IN); Samudra Neel Saha, Kolkata (IN); Kaustav Banerjee, Kolkata (IN)

(72) Inventors: Abhishek Biswas, Kolkata (IN); Samudra Neel Saha, Kolkata (IN); Kaustav Banerjee, Kolkata (IN)

( * ) Notice: Subject to any disclaimer, the term of this patent is extended or adjusted under 35 U.S.C. 154(b) by 134 days.

(21) Appl. No.: 16/970,367

(22) PCT Filed: May 22, 2018

(86) PCT No.: PCT/IN2018/050324
§ 371 (c)(1),
(2) Date: Aug. 16, 2020

(87) PCT Pub. No.: WO2019/171389
PCT Pub. Date: Sep. 12, 2019

(65) Prior Publication Data
US 2021/0065364 A1 Mar. 4, 2021

(30) Foreign Application Priority Data
Mar. 9, 2018 (IN) .............................. 201831008797

(51) Int. Cl.
*G06T 7/00* (2017.01)
*G06F 17/18* (2006.01)
(Continued)

(52) U.S. Cl.
CPC ............ *G06T 7/0012* (2013.01); *G06F 17/18* (2013.01); *G06N 3/0481* (2013.01); *G06N 3/08* (2013.01); *G06V 10/25* (2022.01)

(58) Field of Classification Search
CPC ....... G06T 7/0012; G06V 10/25; G06F 17/18; G06N 3/0481; G06N 3/08
See application file for complete search history.

(56) References Cited

U.S. PATENT DOCUMENTS

| 2017/0061625 A1* | 3/2017 | Estrada | ................... G06T 15/50 |
| 2020/0090519 A1* | 3/2020 | Ding | ...................... G08G 1/168 |

FOREIGN PATENT DOCUMENTS

| CA | 2827122 A1 * | 8/2012 | ......... A61B 5/02007 |

OTHER PUBLICATIONS

Sagi Eppel. "Setting an attention region for convolutional neural networks using region selective features, for recognition of materials within glass vessels". In: eprint arXiv:1708.08711,Published online: Aug. 29, 2017 (pp. 1-4).

* cited by examiner

*Primary Examiner* — Khai M Nguyen
(74) *Attorney, Agent, or Firm* — Rumit R. Kanakia

(57) ABSTRACT

A method for training a convolutional neural network comprises sliding a first, a second and a third window in a predefined path simultaneously on each training image of a training data set, a binary image containing a highlighted region of interest of the each training image, and a labeled image containing a plurality of tags representing one or more features of interest of the each training image. A target matrix is obtained for each sample of the labeled image that lies within the highlighted region of interest. The target matrix is a probabilistic distribution of the plurality of tags that is based on a proportion of existence of a feature of interest represented by a tag in the each sample. The CNN is trained to recognize each sample to contain the proportion of the at least one feature of interest based on the target matrix of the each sample.

26 Claims, 10 Drawing Sheets

(51) Int. Cl.
*G06N 3/04* (2023.01)
*G06N 3/08* (2023.01)
*G06V 10/25* (2022.01)

$$[0.1, 0.7, 0, 0.05, 0.15, 0, 0.1]$$
300
FIG. 3A
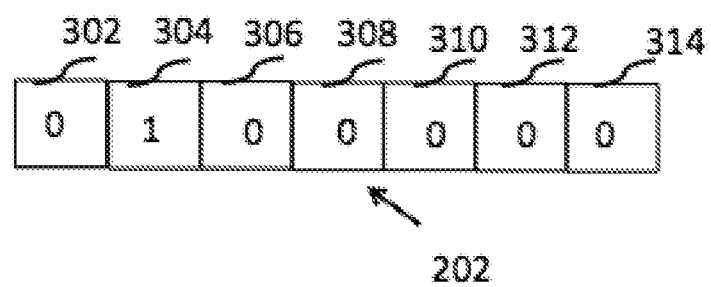
FIG. 3B
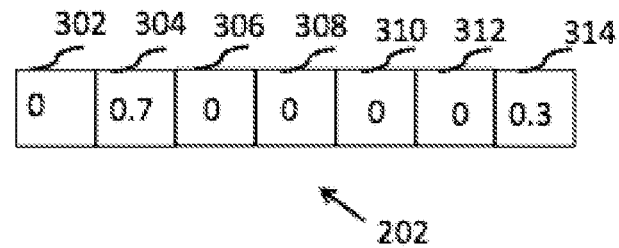
FIG. 3C

PATTERN RECOGNITION BY CONVOLUTIONAL NEURAL NETWORKS

BACKGROUND

Technical Field

The embodiments herein are generally related to convolutional neural networks. More particularly the embodiments herein relate to systems and methods for pattern recognition using convolutional neural networks.

Description of the Related Art

Convolutional Neural Networks (CNNs) are often deployed for recognizing patterns in images. Typically CNNs are trained to extract features of interest and classify the features of interest in a plurality of two-dimensional images. A two dimensional image usually includes a region of interest (ROI) potentially containing one or more features of interest. For example, the two dimensional image may be an ultrasonography (USG) image and the features of interest may correspond to various anatomical parts of the human body. Further it is essential to provide uniform linear shaped two-dimensional images as a training input to the CNN to avoid biasing effect on the CNN.

Existing art involving training of CNNs on USG images may crop an ROI having a linear shape from the USG image that may serve as a training input to the CNN. However cropping linearly shaped ROIs usually results in loss of image data as the USG images may be of convex shape. Other existing arts may deploy techniques that flatten the USG images to attain a linear shape to serve as the training input. However such techniques of flattening USG images may result in distortion of image data present in periphery regions.

Hence there is a need for an alternate system and a method of training the CNN without loss and distortion of the training input. Accordingly an alternate method and system for training the CNN is proposed. The alternate method and system effectively prevents the usual biasing effect while training the CNN on the training input.

The above-mentioned shortcomings, disadvantages, and problems are addressed herein and which will be understood by reading and studying the following specification.

OBJECTIVES OF THE EMBODIMENTS HEREIN

The primary object of the embodiments herein is to provide a method and system for training a CNN without a biasing effect.

Another object of the embodiments herein is to use a sliding window approach to capture image data present in the ROI of a training image before providing it as a training input.

Yet another object of the embodiments herein is to prevent loss and distortion of image data of the training image while providing it as the training input to the CNN.

Yet another object of the embodiments herein is to provide a method and system of training the CNN on USG images that is independent of a span angle and probe size of the USG probe.

Yet another object of the embodiments herein is achieve improved accuracy in detecting features of interest in an input image provided to the CNN.

These and other objects and advantages of the embodiments herein will become readily apparent from the following detailed description taken in conjunction with the accompanying drawings.

SUMMARY

The embodiments herein provide a method and a system for training a convolutional neural network (CNN). According to an embodiment herein, the system comprises at least one processor and a memory having stored machine executable instructions that when executed by the at least one processor, cause the system to slide a first window, a second window and a third window in a predefined path simultaneously on each training image of a training data set, a binary image containing a highlighted region of interest of the each training image, and a labeled image containing a plurality of tags representing one or more features of interest of the each training image. Further, the system is caused to obtain a target matrix for each sample of the labeled image of the each training image contained within the third window during the sliding whenever the second window exists completely within the region of interest of the binary image of the each training image, wherein the target matrix comprises a weighted probabilistic distribution of the plurality of tags, and wherein a weight of a tag in the target matrix is based on a proportion of existence of a feature of interest represented by the tag in the each sample. Further, the system is caused to provide each sample of the each training image contained within the first window along with a target matrix associated with each corresponding sample of the labeled image of the each training image as a training input to the CNN, whenever the second window exists completely within the region of interest of the binary image of the each training image. Furthermore, the system is caused to train the CNN to recognize the each sample of the each training image to contain a proportion of at least one feature of interest based on a weighted representation of the at least one feature of interest in the target matrix associated with the each corresponding sample of the labeled image.

According to an embodiment herein, a method for training the CNN is disclosed. The method includes sliding, by a processor, a first window, a second window and a third window in a predefined path simultaneously on each training image of a training data set, a binary image containing a highlighted region of interest of the each training image, and a labeled image containing a plurality of tags representing one or more features of interest of the each training image. Further, the method includes obtaining, by the processor, a target matrix for each sample of the labeled image of the each training image contained within the third window during the sliding whenever the second window exists completely within the region of interest of the binary image of the each training image, wherein the target matrix comprises a weighted probabilistic distribution of the plurality of tags, and wherein a weight of a tag in the target matrix is based on a proportion of existence of a feature of interest represented by the tag in the each sample. Further the method includes providing, by the processor, each sample of the each training image contained within the first window along with a target matrix associated with each corresponding sample of the labeled image of the each training image as a training input to the CNN, whenever the second window exists completely within the region of interest of the binary image of the each training image. Furthermore, the method includes training, by the processor, the CNN to recognize the each sample of the each training image to contain a proportion of at least one feature of interest based on a weighted representation of the at least one feature of interest in the target matrix associated with the each corresponding sample of the labeled image.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which:

FIG. 3A illustrates a probabilistic distribution of a plurality of tags for a sample of a labeled image of the training image, according to one embodiment herein.

FIG. 3B illustrates a target matrix obtained for the sample referred to in FIG. 3A, of a labeled image of the training image, according to one embodiment herein.

FIG. 3C illustrates a target matrix obtained for the sample referred to in FIG. 3B, of a labeled image of the training image, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a system and a method for training a Convolutional Neural Network (CNN) to identify one or more features of interest in an input image. In an example, the input image may be a two-dimensional image such as an ultrasonography (USG) image and the one or more features of interest may include one or more anatomical features of a human body such as lungs, liver, kidneys, abdomen, genetilia and the like. In an example, the one or more features of interest may include a biological specimen such an animal, a plant or a microbiological organism. In another example, the two-dimensional image may be a image embodying one or more patterns and specific shapes such as numerical numbers or alphabets. In such example, the CNN is trained to identify an alphabet or a numerical number in an input image irrespective of a contour and shape of the input image. Alternatively, disclosed embodiments herein provide a trained CNN that can identify the one or more features of interest in an input image irrespective of the shape of the input image. A system for training the CNN is explained with reference to FIG. 1.

Figure 1:
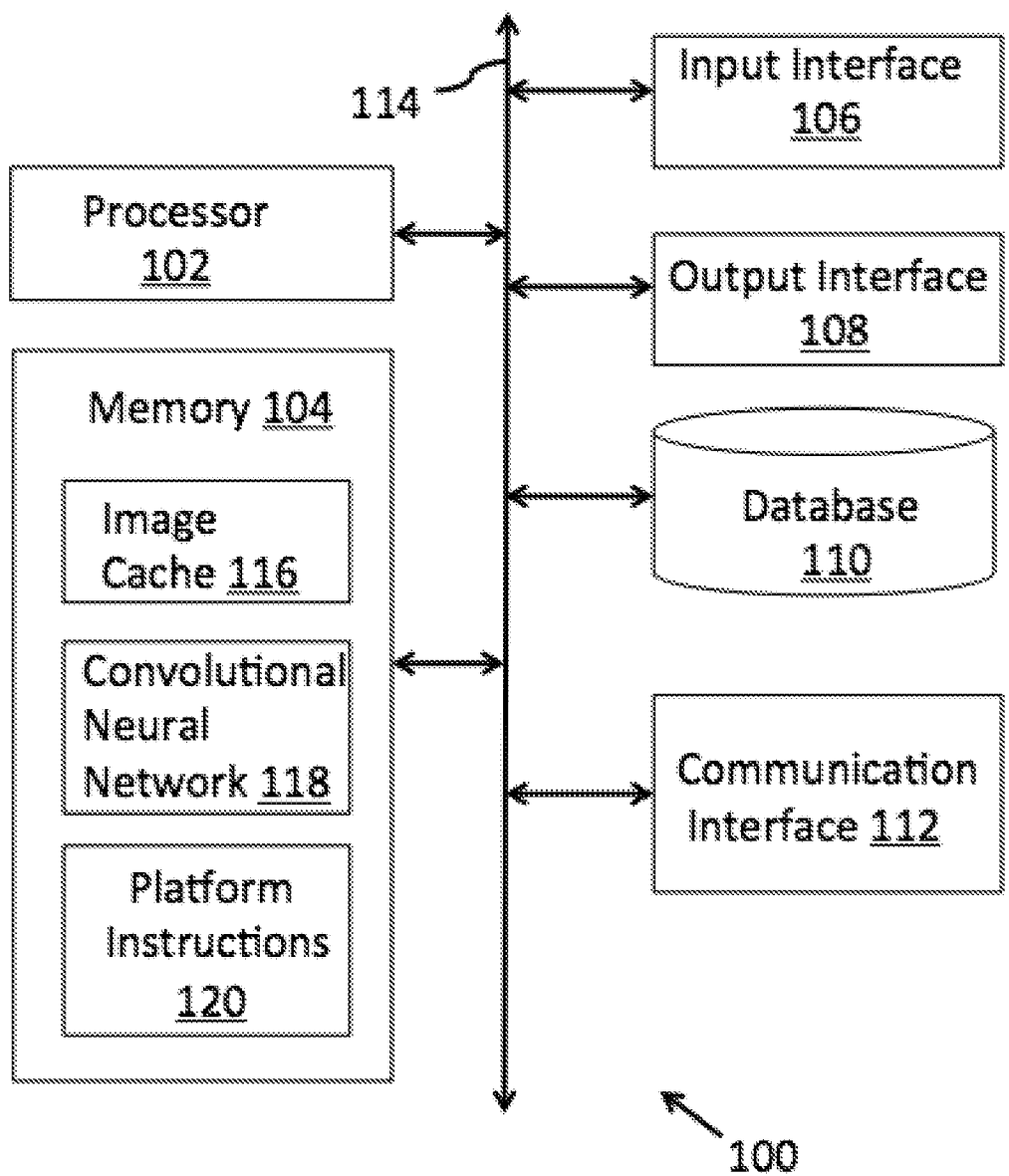
FIG. 1 illustrates a system for training a convolutional neural network (CNN), according to one embodiment herein.

FIG. 1 illustrates a system 100 for training a convolutional neural network 118 (CNN), according to one embodiment. The system 100 includes at least one processor such as processor 102, and a memory 104. It may be noted that although the system 100 is depicted to include only one processor, the system 100 may include more number of processors therein. In an embodiment, the memory 104 is capable of storing machine executable instructions referred to herein as platform instructions 120. In an embodiment, the processor 102 may be embodied as a multi-core processor, a single core processor, or a combination of one or more multi-core processors, and one or more single core processors. For example, the processor 102 may be embodied as one or more of various processing devices such as a coprocessor, a microprocessor, a controller, a digital signal processor (DSP), a processing circuitry with or without an accompanying DSP, or various other processing devices including integrated circuits such as, for example, an application specific integrated circuit (ASIC), field programmable gate array (FPGA), a microcontroller unit (MCU), a hardware accelerator, a special-purpose computer chip, or the like. In an embodiment, the processor 102 is embodied as an executor of software instructions, wherein the instructions may specifically configure the processor 102 to perform the algorithms and/or operations described herein when the instructions are executed.

The memory 104 may be embodied as one or more non-volatile and volatile memory devices, and/or a combination thereof. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R/W (compact disc rewritable), DVD (digital video disc), BD (BLU-RAY® Disc) and semiconductor memory devices such as Read Only Memory (ROM), Programmable Read Only Memory (PROM), Erasable Programmable Read Only Memory (EPROM), Random Access Memory (RAM), flash memory, and the like.

The memory 104 may include the CNN 118 and an image cache 116. The CNN 118 may be embedded in a ROM chip, an EPROM chip, a PROM chip or any such semiconductor device. The CNN 118 may be trained by the processor 102 to identify the one or more features of interest in the input image. The image cache 116 may be a semiconductor memory device such as a ROM chip capable of storing one or more training images used for training the CNN 118. The processor 102 processes each training image present in the image cache 116 to produce a binary image and a labeled image of the each training image. The each training image, the binary image and the labeled image of the each training image are used simultaneously to train the CNN 118 as discussed detail in reference to FIG. 2A-2B.

Further, the system 100 includes an input interface 106 and an output interface 108, a database 110, and at least one communication interface such as the communication interface 112. In an embodiment, the input interface 106 may include a user interface, input devices, or such mechanisms that can receive inputs from a user of the system 106. Examples of input interface 108 may include, but are not limited to, a keypad, a keyboard, a mouse, a joystick, a touch screen, soft keys and the like. The user is typically a system engineer, a designer or an operator intending to train the CNN 118. The user can provide a training data set including a plurality of training images used for training the CNN 118 as an input via the input interface 106. The training data set is usually stored in the database 110. The database 110 may be a non-volatile memory device or a storage device such as hard disks, flash memory, optical media discs, and the like.

The output interface 108 may include output devices, and mechanisms that provide a visual output to the user. Examples of the output interface 108 may include, but are not limited to, a visual display such as a Liquid Crystal Display (LCD), a Light Emitting Diode (LED) display, a thin-film transistor (TFT) display, an active-matrix organic light-emitting diode (AMOLED) display and the like. In an embodiment, the user can view the each training image, and the training procedure of the CNN 118 on the output interface 108.

Further, in an embodiment, the processor 102 may include input/output circuitry that control at least some functions of one or more elements of the input interface 106 and the output interface 108. The processor 102, and/or the input/output circuitry may control one or more functions of the one or more elements of the input interface 106 and the output interface 108 through computer program instructions, such as software or firmware stored in a memory such as the memory 104, accessible to the processor 102.

The communication interface 112 may include multiple channel interfaces to communicate with a plurality of interaction channels. Some non-limiting examples of the interaction channels may include a web interaction channel, (for example, an interactive web channel provided with a website hosted by a web server to communicate the training data set to the processor 102 located on a remote server), a chat channel (for example a chat support), a native mobile application channel, a social media channel and the like. A channel interface may be associated with respective communication circuitry such as a transreceiver circuitry, an antenna system and other communication media interfaces to connect to a wired and/or wireless communication network. The communication circuitry associated with each channel interface may, in at least some example, embodiments, enable transmission of data signals and/or reception of signals from remote network entities, such as web servers hosting a website, or a server located at a customer location or a service diagnostic center that maintains real-time information regarding the training of the CNN 118.

In an embodiment, various components of the system 100, such as the processor 102, the memory 104, the input interface 106, the output interface 108, the communication interface 122 are configured to communicate with each other via or through a centralized circuit system 114. The centralized circuit system 110 enables communication between the components 102-108 of the system 100. In certain embodiments, the centralized circuit system 114 may be a central printed circuit board (PCB) such as a motherboard, a main board, a system board, or a logic board. The centralized circuit system 114 may also, or alternatively, include other printed circuit assemblies (PCAs) or communication channel media.

It may be noted that the system 100 as illustrated in FIG. 1 is merely illustrative of a system that can benefit from embodiments of this present disclosure, and therefore, should not be taken to limit the scope of the invention. It may further be noted that the system 100 may include fewer or more components than those depicted in FIG. 1. In an embodiment, the system 100 may be implemented as a platform including a mix of existing open systems, proprietary systems and third party systems. In another embodiment, the system 100 may be implemented completely as a platform including a set of software layers on top of existing hardware system. In another embodiment, one or more components of the system 100 may be deployed in a web server. In another embodiment, the system 100 may be a standalone components in a remote machine connected to a communication network and capable of executing a set of instructions to facilitate training of the CNN 118. Further, the system 100 may be implemented as a centralized system, or a distributed system.

Further, embodiments described herein illustrate the system 100 to train a single CNN such as the CNN 118, however it may be understood that the system 100 is capable of training a plurality of such CNNs. In an embodiment, the processor 102 is configured to, with machine executable instructions such as the platform instructions 120 of the memory 104, cause the system 100 to train the CNN 118 to recognize one or more features of interest in the plurality of training images of the training data set stored in the database 110. Training of the CNN 118 may be explained further with reference to FIG. 2A-2B.

Figure 2A:
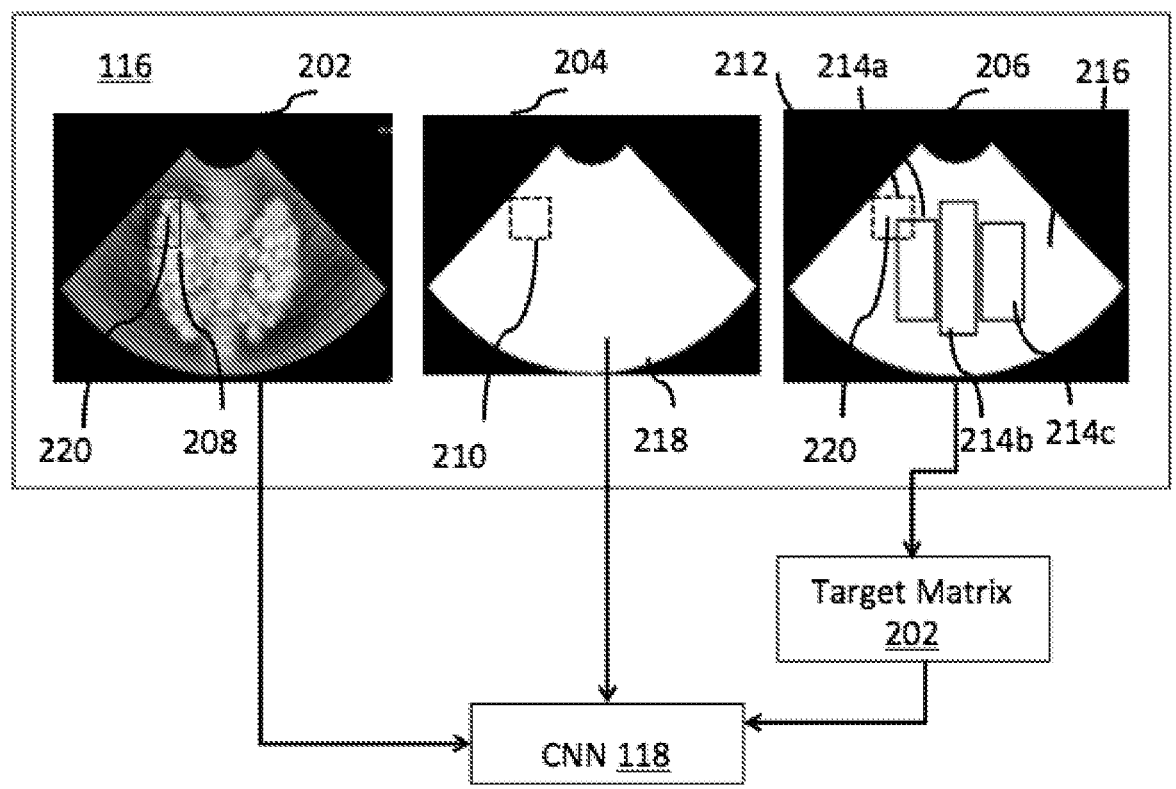
FIG. 2A illustrates a sliding window procedure followed by the system of FIG. 1 while training the CNN on a training image, according to one embodiment herein.

FIG. 2A illustrates a sliding window procedure followed by the system 100 of FIG. 1 while training the CNN 118 on each training image of the training data set, according to one embodiment herein. Initially, the processor 102 causes the system 102 to load the each training image such as a training image 202 of the training data set into the image cache 116. Further, the processor 102 may cause the system 100 to create a binary image of the each training image, such as binary image 204 of the training image 202 using a connected region approach. The binary image 204 as shown is a single bit monochrome image where a region of interest (ROI) 218 is highlighted. The ROI 210 typically includes the one or more features of interest. In an embodiment, the processor 102 may cause the system to, replace each pixel within the ROI 218 with a single bit and a remaining part of the binary image 204 with another single bit. For example, as shown each pixel of the ROI 218 is replaced with a monochrome bit 1 illustrated by white color, and the remaining part is replaced with a monochrome bit 0 illustrated by black color. The ROI 218 is an enclosed space containing the one or more of features of interest present in the training image 202.

Further, the processor 102 may cause the input interface 106 to enable at least one user interacting with the system 100 to mark a boundary for a portion such as portion 214a, portion 214b or portion 214c, existing within a copy of the training image 202, where the portion such as the portion 214a, the portion 214b or the portion 214c include at least one feature of interest. For example, the input interface 106 may include a stylus that enables the at least one user to mark a boundary on a display of the copy of the training image 202 on the output interface 108. Further, the system 100 may be caused to receive from the at least one user a tag representing a feature of interest included within the each portion. Furthermore, the processor 102 may cause the system 100 to create a labeled image of the each training image such as a labeled image 206 of the training image 202 by replacing each pixel in the each portion by the tag representing the feature of interest included within the each portion, and replacing each pixel in a remaining portion 216 of the each training image that is excluded from the one or more portions by a null tag.

For example, the at least one feature of interest may include at least one of a particular body part, a biological specimen, a specific pattern, and a specific shape based on a type of the training data set. In an example, where the training data set is a plurality of USG images of a human body, the at least one feature of interest may correspond to patterns of organs, tissues, and cells of the human body.

Further, the processor 102 may cause the image cache 116 to receive the each training image as the training image 202 from the database 110. The processor 102 may also cause the image cache 116 to store the binary image and the labeled image of the each training image such as the binary image 204 and the labeled image 206 along with the training image 202 until the CNN 118 is trained to recognize each sample of the each training image such as the training image 202.

Figure 2B:
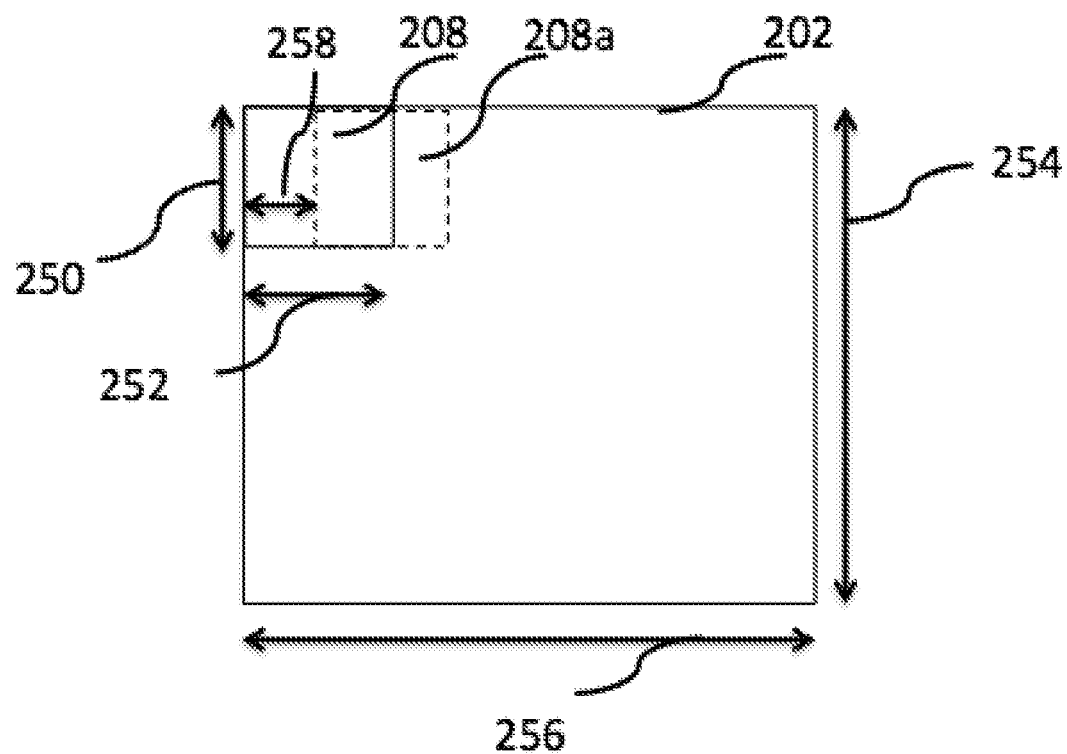
FIG. 2B illustrates a movement of a sliding window on the training image during the sliding window procedure, according to one embodiment herein.

In order to train the CNN 118, the processor 102 causes the system 100 to slide a first window 208, a second window 210 and a third window 212 in a predefined path simultaneously on each training image such as the training image 202 of a training data set, the binary image containing a highlighted ROI of the each training image such as the binary image 204 containing ROI 218 of the training image 202, and the labeled image containing a plurality of tags representing one or more features of interest of the each training image such as the labeled image 206 of the training image 202. Sliding of the first window 208 on the training image 202 is illustrated in FIG. 2B. FIG. 2B depicts the training image 202 having a length 256 and width 254. Further, the first window 208 is depicted to include a length 252 and width 250. In an example, for the training image 202 having the length 256 of 400 pixels, and the width 254 of 400 pixels, the first window 208 can have the length 252 of 30 pixels and the width 250 of 30 pixels. Sliding of the first window 208 in the predefined path on the training image 202 includes a plurality of slide movements. In each slide movement the first window 208 is made to traverse a predefined number of pixels in a horizontal direction and/or vertical direction. As shown, the first window 208 is traversed in a horizontal direction by a distance 258 to a new position 208a during a single slide movement. In an example, the distance 258 can be 10 pixels. Such slide movement is repeated to perform the sliding across the training image 202. Accordingly, the sliding across the binary image 204 and the labeled image 206 is performed. The first window 208, the second window 210 and the third window 212 have identical dimensions of n*n pixels, for example 30*30 pixels as shown in FIG. 2B.

Further, the processor 102 causes the system 100 to obtain a target matrix for each sample of the labeled image of the each training image such as a target matrix 202 for a sample 220 of the labeled image 206 contained within the third window 212 during the sliding whenever the second window 210 exists completely within the ROI 218 of the binary image of the each training image such as the binary image 204. The target matrix comprises a weighted probabilistic distribution of the plurality of tags, where a weight of a tag in the target matrix is based on a proportion of existence of a feature of interest represented by the tag in the each sample. For example, the target matrix 202 comprises a weighted probabilistic distribution of the plurality of tags present in the sample 220 as shown in FIG. 3A-3C. FIG. 3A, illustrates a probabilistic distribution 300 of the plurality of tags present in the sample 212. As shown weight of a tag present in the probabilistic distribution 300 comprises a ratio of area covered by a feature of interest represented by the tag to a total area of the sample 212. Further, as shown in FIG. 3B-3C, the target matrix 202 as a one-dimensional matrix, comprising a plurality of columns 302-314 corresponding to the plurality of tags. A value of a column or cell of the target matrix 202 is a weight assigned to a tag represented by the corresponding cell.

In an embodiment, as shown in FIG. 3B, the processor 102 causes the system 100 to assign a total weight of the target matrix 202 which is one (1) to a tag when an area covered by a feature of interest represented by the tag in the third window is above a predetermined first threshold. For example, if the first threshold is set to 0.6, then as the probabilistic distribution 300 depicts the second tag represented by the column 304 to have a weight of 0.7, the tag represented by 304 shall be assigned the total weight of 1. Accordingly, a remaining of the plurality of tags are assigned a value of zero (0). In another embodiment, as shown in FIG. 3C, the processor 102 causes the system 100 to assign a weight to a tag equal to a proportion of area covered by a feature of interest represented by the tag in the third window when the proportion of area covered is above a predetermined second threshold. Further, the processor 102 causes the system 100 to assign a balance weight to a null tag, wherein the balance weight is a summation of weights of remaining tags of the target matrix wherein each feature of interest represented by each remaining tag covers a proportion of area less than the predetermined second threshold. For example, if the second predetermined threshold is 0.55, then as the second tag represented by 304 is 0.7 and is greater than 0.55, the tag 304 is assigned a weight equal to the weight of the tag present in the probabilistic distribution 300. Further, as the summation of weights of the remaining tags equal to 0.3 which is less than the second predetermined threshold of 0.55, the balance weight of 0.3 is assigned to the null tag which is represented by the column 314.

Further, the processor 102 causes the system 100 to provide each sample of the each training image contained within the first window 208 along with a target matrix associated with each corresponding sample of the labeled image of the each training image as a training input to the CNN 118, whenever the second window 210 exists completely within the ROI 218 of the binary image of the each training image. Hence, a sample 220 present within the first window 208 is provided along with the target matrix 202 that corresponds to the corresponding sample 220 as the training input to the CNN 118. It is noted that the sample 220 and the target matrix 202 of the corresponding sample 220 is provided as the training input only when the second window 210 is completely present within the ROI 218. In an instant when the second window 210 is partially present in the ROI 218, a corresponding sample of the training image 202 that is present within the first window 208 at that instant is not considered as the training input to the CNN 118. Accordingly, the target matrix for a corresponding sample of the labeled image 206 at that instant is not obtained.

Further, the processor 102 causes the system 100 to train the CNN 118 to recognize the each sample of the each training image to contain a proportion of at least one feature of interest based on a weighted representation of the at least one feature of interest in the target matrix associated with the each corresponding sample of the labeled image. Techniques known in art for training of the convolutional neural networks maybe deployed for purpose of training the CNN 118.

Figure 4A:
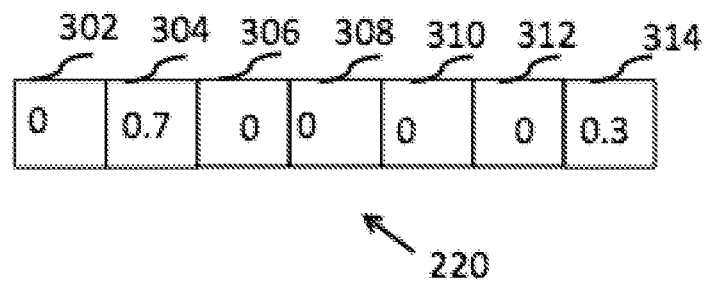
FIG. 4A illustrates the sample, referred to in FIG. 3A, as recognized by the CNN during the training, according to one embodiment herein.
Figure 4B:
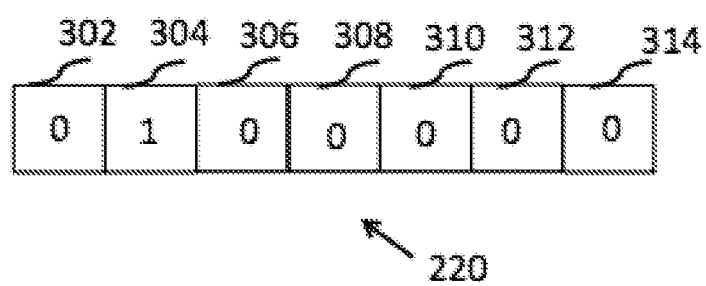
FIG. 4B illustrates the sample, referred to in FIG. 3A, as recognized by the CNN during the training, according to one embodiment herein.

In an embodiment, as shown in FIG. 4A, the CNN 118 recognizes the sample 220 to contain a 0.7 proportion of a feature of interest represented by the second tag 304 based on the weighted representation of the feature of interest in the target matrix 202 as illustrated in FIG. 3C. In an embodiment, as shown in FIG. 4B, the CNN 118 recognizes the sample 220 to contain a proportion of 1.0 of a feature of interest represented by the second tag 304 based on the weighted representation of the feature of interest in the target matrix 202 as illustrated in FIG. 3B.

Further, the processor 102 may cause the system 100 to downsize the each training image, the binary image of the each training image and the labeled image of the each training image to a plurality of downsized images having successively reducing dimensions where a dimension of a downsized image is not less than a dimension of the first window, when the CNN is trained on the each sample of the each training image of an original size. The system 100 is further caused to slide the first window 208, the second window 210 and the third window 212 in a predefined path simultaneously on a downsized training image, a downsized binary image and a downsized labeled image having a predefined reduced dimension, respectively. The processor 102 further causes the system 100 to obtain a target matrix for each sample of the downsized labeled image contained within the third window during the sliding, where the target matrix includes a weighted probabilistic distribution of the plurality of tags, wherein the weights of the plurality of tags is based on a proportion of existence of the one or more features in the each sample of the downsized labeled image.

The processor 102 further causes the system 100 to provide a sample of the downsized training image contained within the first window 208 along with a target matrix associated with a corresponding sample of the downsized labeled image contained within the third window 212 as a training input to the CNN 118 whenever the second window 210 exists completely within the ROI of the downsized binary image. The processor 102 further causes the system 100 to train the CNN 118 to recognize the each sample of the downsized training image to contain a proportion of at least one feature of interest based on a weighted representation of the at least one feature in the target matrix associated with the each corresponding sample of the downsized labeled image. In an embodiment, downsizing the each training image and the each labeled image enables capturing a feature of interest in whole and a tag associated with the feature of interest within the first window 208 and the third window 212 respectively, and training the CNN 118 on an entire shape and contour of the feature of interest. Aforesaid procedure of training the CNN 118 is repeated for the each training image of the training data set. On completion of the training, the CNN 118 is referred to as a trained CNN 502 (see FIG. 5) is tested on an input image. Testing of the CNN 118 is described in reference to FIG. 5.

Figure 5:
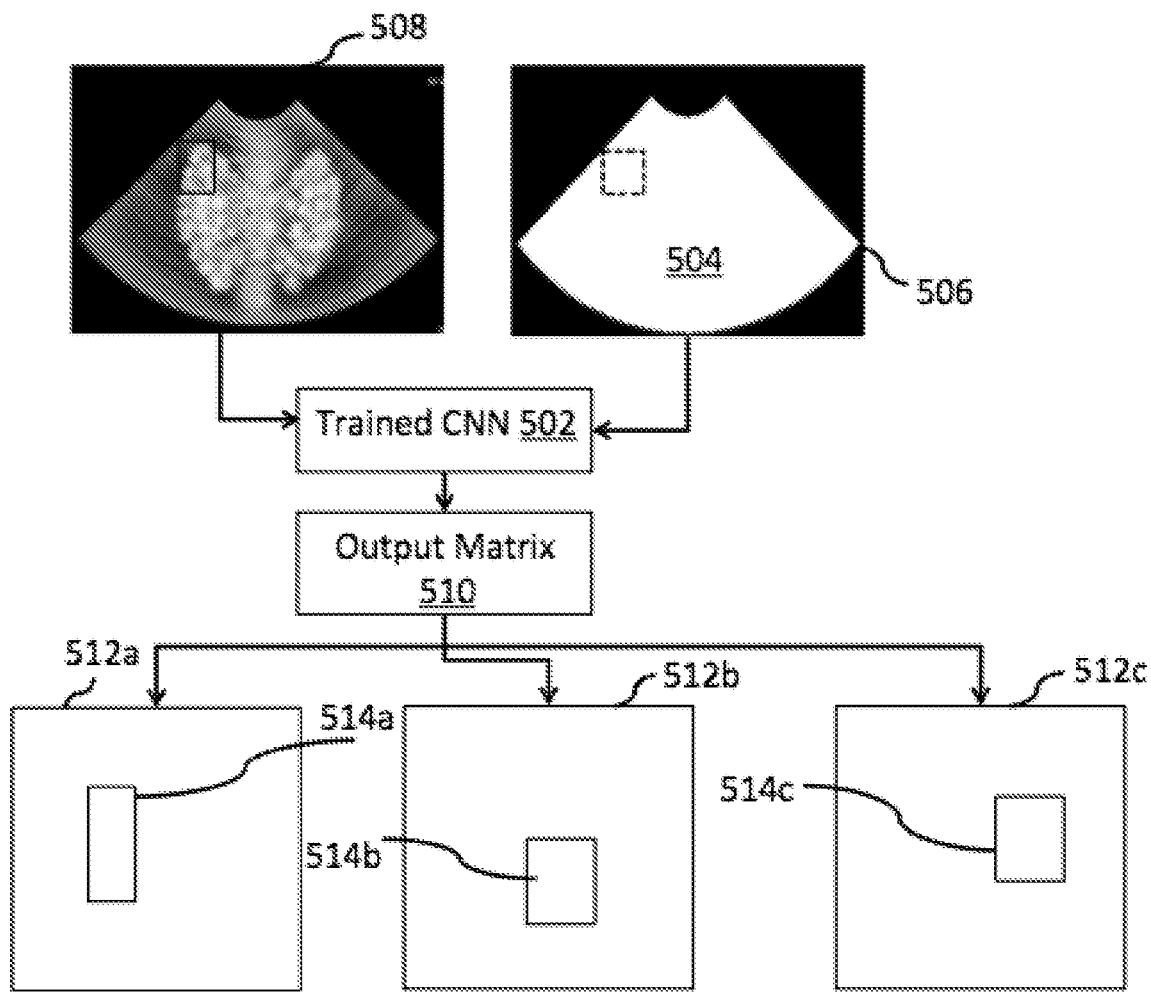
FIG. 5 illustrates an output to an input image provided to the trained CNN, according to one embodiment herein.

FIG. 5 illustrates an input image 508 provided as an input to a trained CNN 502. The processor 102 causes the system 100 to create a binary image 506 highlighting a region of interest 504 of the input image 508. The region of interest 504 includes one or more features of interest to be detected by the trained CNN 502. Further, the trained CNN 502 provides an output matrix 510 containing a probability distribution of a plurality of tags for each sample of the input image 508 that lies within the highlighted region of interest 504. Furthermore, the processor 102 causes the system 100 to highlight a feature of interest in the each sample of the input image 508 based on a weight of a tag representing the feature of interest present in the output matrix 510. Furthermore, the processor 102 causes the system 100 to create one or more output images, where each output image comprises a distinct highlighted feature of interest in the input image 508. The feature of interest in the each sample is highlighted when the weight of the tag representing the feature of interest in the probabilistic distribution exceeds a predefined third threshold. For example, an output image 512*b* comprises a distinct highlighted feature of interest 514*b*, and an output image 512*c* comprises a distinct highlighted feature of interest 514*c*. Further, the output interface 108 may display the one or more output images 514*a-c* for viewing purpose by the at least one user.

Figure 6:
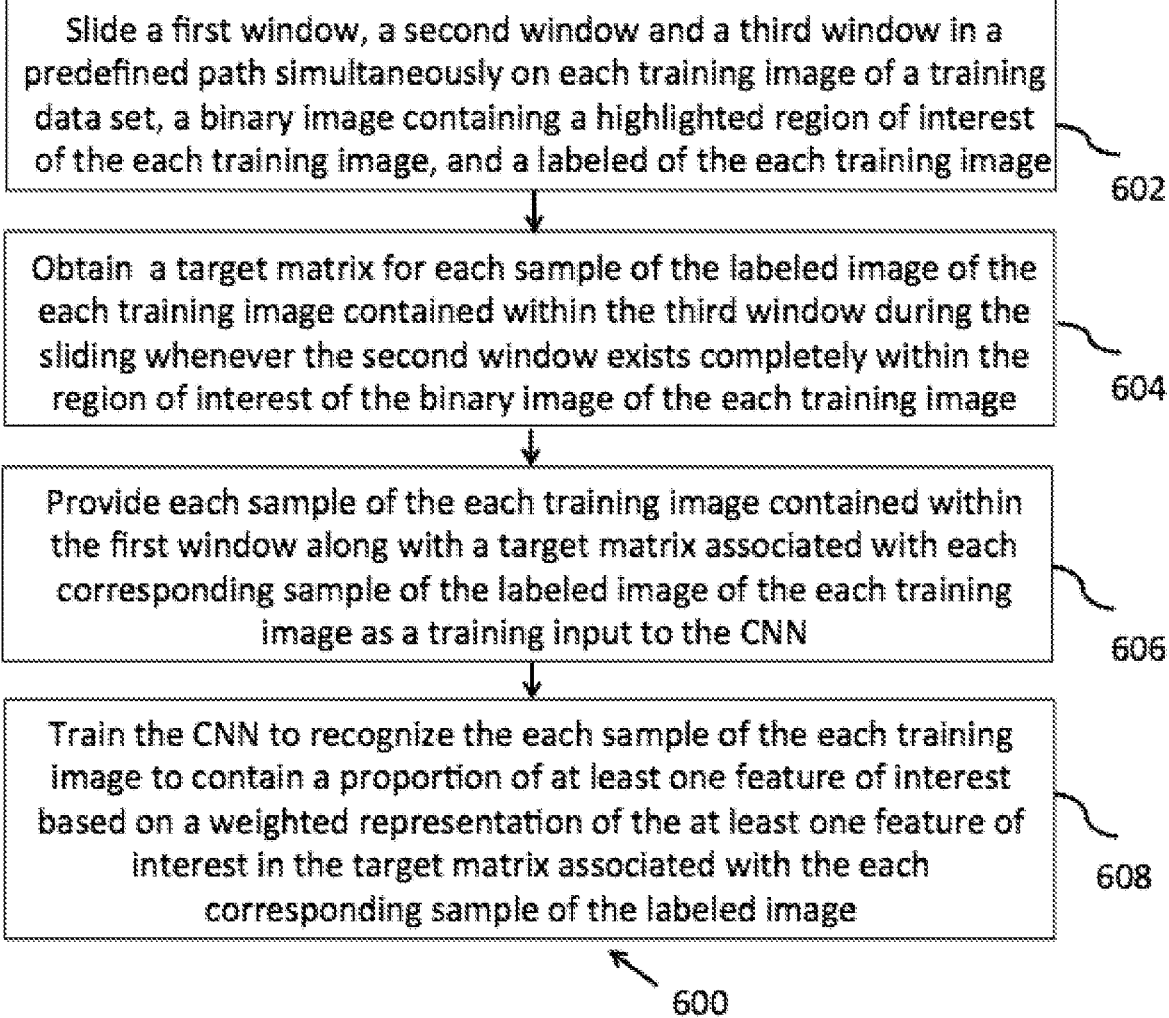
FIG. 6 illustrates an example flowchart of a method for training the CNN, according to one embodiment herein.

FIG. 6 illustrates an example flowchart of a method 600 for training a CNN, (such as CNN 118 of FIG. 1), according to one embodiment herein. At 602, a sliding movement of a first window, a second window and a third window is performed by a processor, in a predefined path simultaneously on each training image of a training data set, a binary image containing a highlighted region of interest of the each training image, and a labeled image containing a plurality of tags representing one or more features of interest of the each training image.

At 604, a target matrix for each sample of the labeled image of the each training image contained within the third window during the sliding whenever the second window exists completely within the region of interest of the binary image of the each training image is obtained by the processor. The target matrix includes a weighted probabilistic distribution of the plurality of tags, and wherein a weight of a tag in the target matrix is based on a proportion of existence of a feature of interest represented by the tag in the each sample.

At 606, each sample of the each training image contained within the first window along with a target matrix associated with each corresponding sample of the labeled image of the each training image is provided by the processor as a training input to the CNN, whenever the second window exists completely within the region of interest of the binary image of the each training image.

At 608, the CNN is trained by the processor to recognize the each sample of the each training image to contain a proportion of at least one feature of interest based on a weighted representation of the at least one feature of interest in the target matrix associated with the each corresponding sample of the labeled image. A preferred method of training the CNN 118 is explained with reference to FIGS. 7A-7C.

Figure 7A:
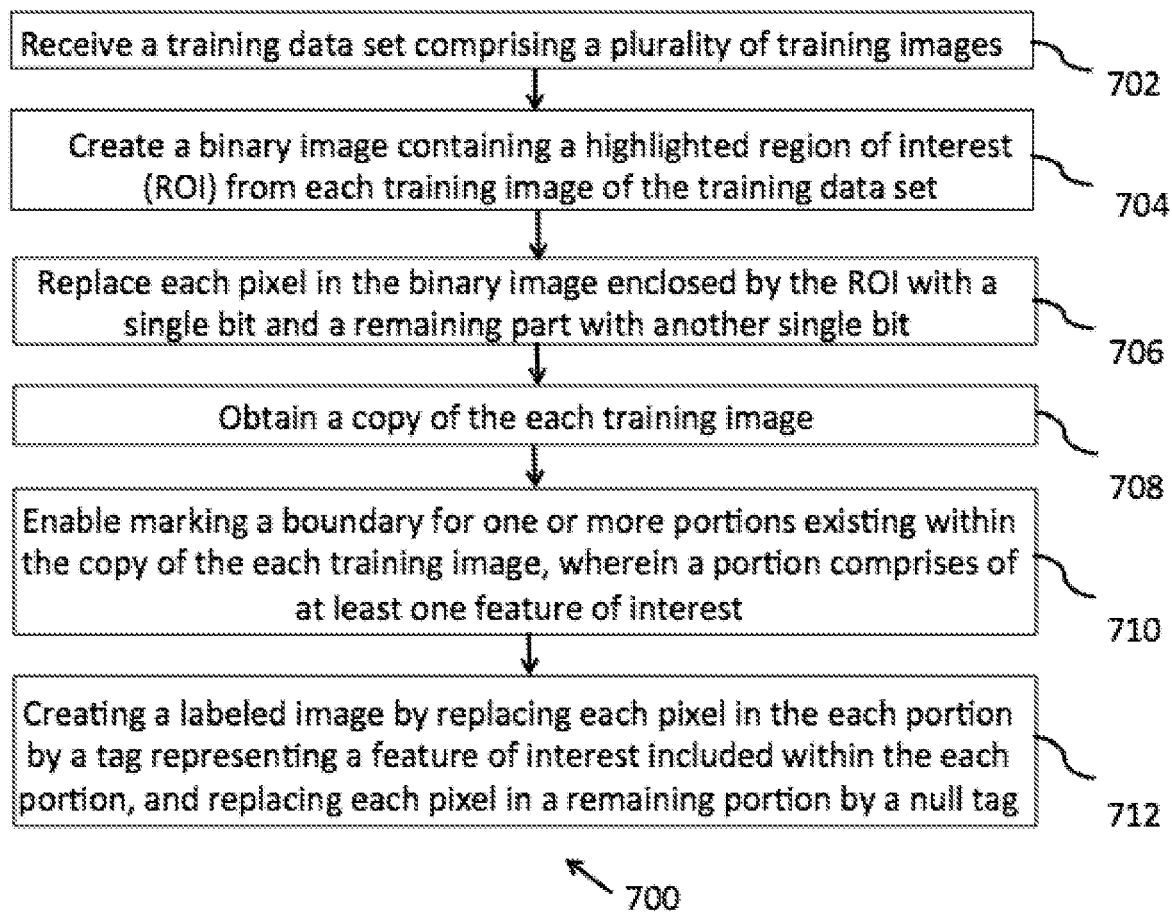
FIG. 7A-7C illustrates an example flowchart of method for training the CNN, according to one embodiment herein.
Figure 7B:
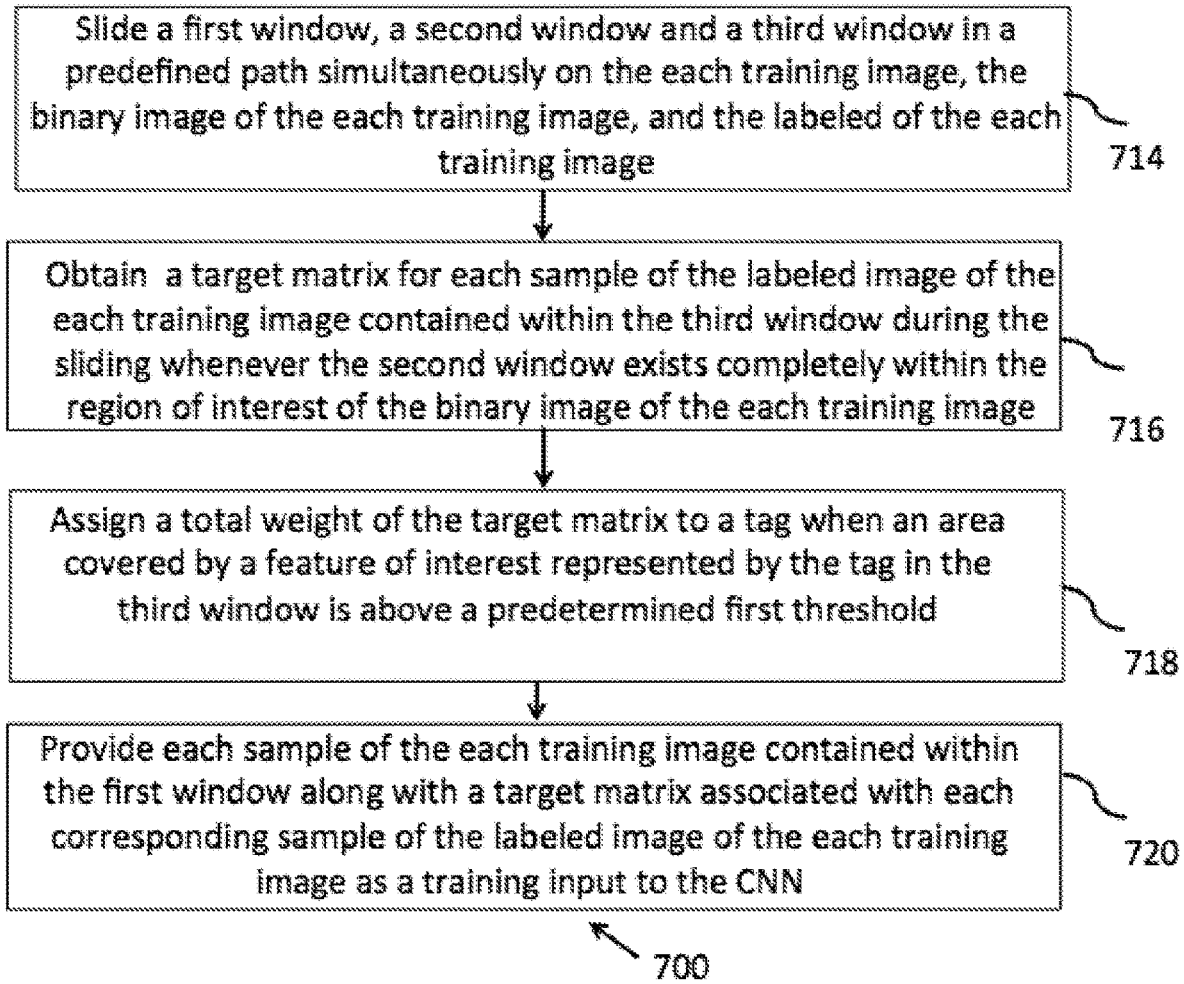
Figure 7C:
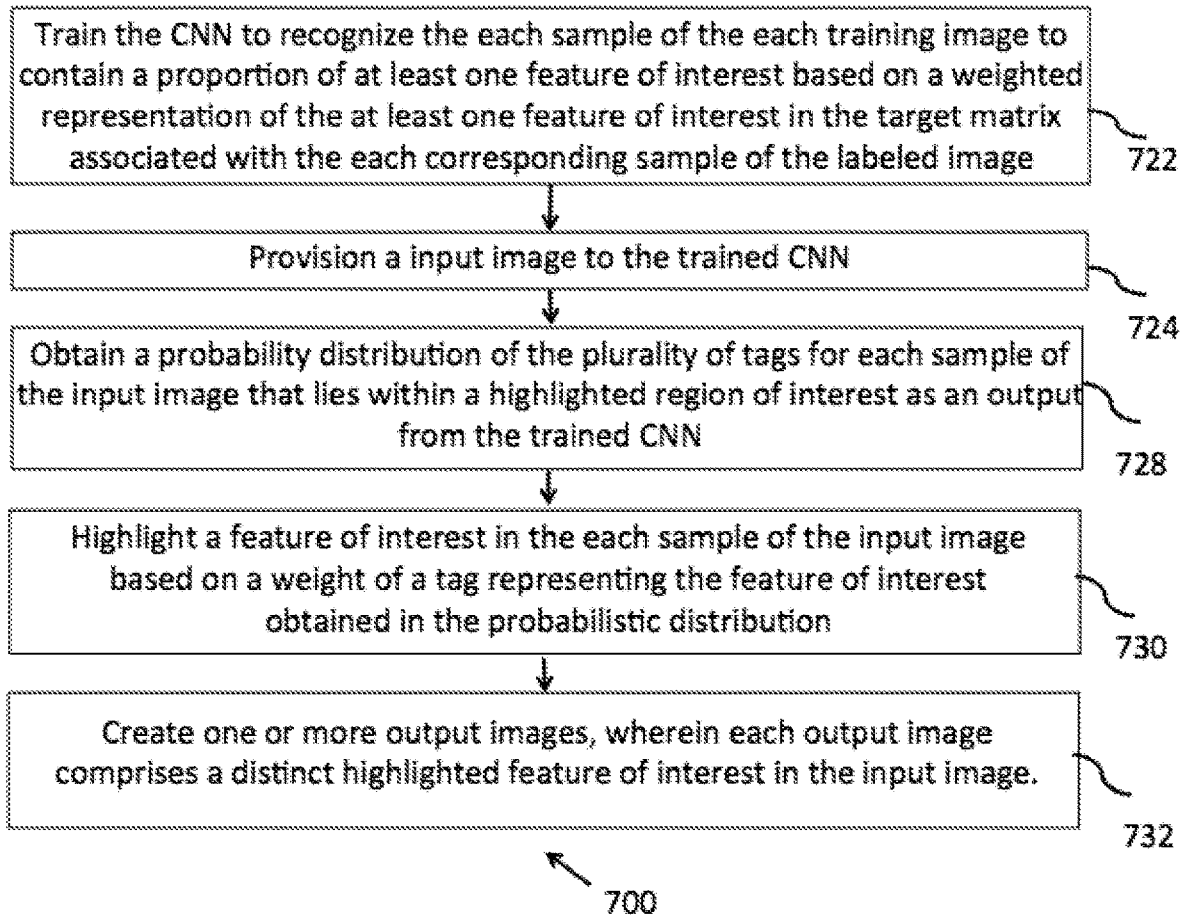

FIGS. 7A-7C depicts an example flowchart 700 illustrating a method of training a CNN (such as the CNN 118 of FIG. 1). At 702, a training data set comprising a plurality of training images is received by a processor. The training data set may be stored in a database.

At 704, a binary image containing a highlighted region of interest (ROI) from each training image of the training data set is created by the processor. The binary image may be stored in an image cache accessible by the processor.

At 706, each pixel in the binary image enclosed by the ROI is replaced by the processor, with a single bit and a remaining part is replaced with another single bit.

At 708, a copy of the each training image is obtained from a database by the processor, and stored in the image cache.

At 710, marking a boundary of a portion existing within the copy of the each training image by a user is enabled by the processor, where a portion comprises of at least one feature of interest.

At 712, a labeled image is created by the processor, by replacing each pixel in each portion by a tag representing a feature of interest included within the each portion, and replacing each pixel in a remaining portion by a null tag.

At 714, a sliding movement of a first window, a second window and a third window is performed by the processor, in a predefined path simultaneously on the each training image of the training data set, the binary image containing the highlighted region of interest of the each training image, and the labeled image containing a plurality of tags representing one or more features of interest of the each training image.

At 716, a target matrix for each sample of the labeled image of the each training image contained within the third window during the sliding whenever the second window exists completely within the region of interest of the binary image of the each training image is obtained by the processor. The target matrix includes a weighted probabilistic distribution of the plurality of tags, and wherein a weight of a tag in the target matrix is based on a proportion of existence of a feature of interest represented by the tag in the each sample.

At 718, each sample of the each training image contained within the first window along with a target matrix associated with each corresponding sample of the labeled image of the each training image is provided by the processor as a training input to the CNN, whenever the second window exists completely within the region of interest of the binary image of the each training image.

At 720, the CNN is trained by the processor to recognize the each sample of the each training image to contain a proportion of at least one feature of interest based on a weighted representation of the at least one feature of interest in the target matrix associated with the each corresponding sample of the labeled image.

At 724, an input image is provisioned by the processor to the trained CNN, for testing the trained CNN.

At 726, a probability distribution of a plurality of tags for each sample of the input image that lies within a highlighted region of interest is obtained by the processor as an output from the trained CNN.

At 728, a feature of interest in the each sample of the input image is highlighted based on a weight of a tag representing the feature of interest obtained in the probabilistic distribution.

At 730, one or more output images, is created by the processor, where each output image comprises a distinct highlighted feature of interest in the input image.

Disclosed embodiments herein, provide an improved method and system for training the CNN, without a biasing effect. The trained CNN can identify one or more features of interest representing multiple patterns, shapes and sizes in input images irrespective of a shape and contour of the input images. An accuracy of feature detection by CNNs trained by disclosed embodiments herein is above 95%. Further, due to disclosed sample based approach, a memory and processing requirement on a system used for training the CNN is lesser in comparison to prior art techniques used for training CNNs.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system comprising:
   at least one processor; and
   a memory having stored therein machine executable instructions, that when executed by the at least one processor, cause the system to:
   slide a first window, a second window and a third window in a predefined path simultaneously on each training image of a training data set, a binary image containing a highlighted region of interest of the each training image, and a labeled image containing a plurality of tags representing one or more features of interest of the each training image;
   obtain a target matrix for each sample of the labeled image of the each training image contained within the third window during the sliding whenever the second window exists completely within the region of interest of the binary image of the each training image, wherein the target matrix comprises a weighted probabilistic distribution of the plurality of tags, and wherein a weight of a tag in the target matrix is based on a proportion of existence of a feature of interest represented by the tag in the each sample;
   provide each sample of the each training image contained within the first window along with a target matrix associated with each corresponding sample of the labeled image of the each training image as a training input to the CNN, whenever the second window exists completely within the region of interest of the binary image of the each training image; and
   train the CNN to recognize the each sample of the each training image to contain a proportion of at least one feature of interest based on a weighted representation of the at least one feature of interest in the target matrix associated with the each corresponding sample of the labeled image.

2. The system of claim 1, wherein the system is further caused to:
   assign a total weight of the target matrix to a tag when an area covered by a feature of interest represented by the tag in the third window is above a predetermined first threshold.

3. The system of claim 1, wherein the system is further caused to:
   assign a weight to a tag of the target matrix equal to a proportion of area covered by a feature of interest represented by the tag in the third window when the proportion of area covered is above a predetermined second threshold; and assign a balance weight to a null tag, wherein the balance weight is a summation of weights of remaining tags of the target matrix wherein each feature of interest represented by each remaining tag covers a proportion of area less than the predetermined second threshold.

4. The system of claim 1, wherein the system further comprises:

an input interface configured to:
receive the training data set comprising a plurality of training images from one or more imaging devices;
enable at least one user to mark a boundary for a portion existing within a copy of the each training image, wherein a portion comprises of at least one feature of interest; and
receive from the at least one user a tag representing a feature of interest included within the each portion.

5. The system of claim 4, wherein the system is further caused to:

create the labeled image of the each training image by replacing each pixel in the each portion by the tag representing the feature of interest included within the each portion, and replacing each pixel in a remaining portion of the each training image that is excluded from the one or more portions by a null tag.

6. The system of claim 1, wherein the system is further caused to:

create, the binary image containing the highlighted region of interest from the each training image using a connected region approach, wherein the binary image is a single bit monochrome image and wherein the region of interest (ROI) is an enclosed space containing the one or more of features of interest and a remaining part of the binary image excluding the ROI comprises background information that is excluded during the training; and
replace each pixel in the binary image enclosed by the ROI with a single bit and the remaining part with another single bit.

7. The system of claim 1, wherein the system further comprises:

a database configured to store the training data set;
an image cache provided within the memory, the image cache configured to:
receive the each training image from the database; and
store the binary image and the labeled image of the each training image until the CNN is trained to recognize the each sample of the each training image.

8. The system of claim 1, wherein the system is further caused to:

downsize the each training image, the binary image of the each training image and the labeled image of the each training image to a plurality of downsized images having successively reducing dimensions where a dimension of a downsized image is not less than a dimension of the first window, when the CNN is trained on the each sample of the each training image of an original size;
slide the first window, the second window and the third window in a predefined path simultaneously on a downsized training image, a downsized binary image and a downsized labeled image having a predefined reduced dimension, respectively;
obtain a target matrix for each sample of the downsized labeled image contained within the third window during the sliding, the target matrix comprising a weighted probabilistic distribution of the plurality of tags, wherein the weights of the plurality of tags is based on a proportion of existence of the one or more features in the each sample;
provide a sample of the downsized training image contained within the first window along with a target matrix associated with a corresponding sample of the downsized labeled image contained within the third window as a training input to the CNN whenever the second window exists completely within the region of interest of the downsized binary image; and
train the CNN to recognize the each sample of the downsized training image to contain a proportion of at least one feature of interest based on a weighted representation of the at least one feature in the target matrix associated with the each corresponding sample of the downsized labeled image.

9. The system of claim 8, wherein the downsizing the each training image and the each labeled image enables capturing a feature of interest in whole and a tag associated with the feature of interest within the first window and the third window respectively, and training the CNN on an entire shape and contour of the feature of interest.

10. The system of claim 1, wherein the first window, the second window and the third window have identical dimensions of n*n pixels.

11. The system of claim 1, wherein the system is further caused to:

provision an input image to the trained CNN;
obtain an output matrix containing a probability distribution of a plurality of tags for each sample of the input image that lies within a highlighted region of interest as an output from the trained CNN;
highlight a feature of interest in the each sample of the input image based on a weight of a tag representing the feature of interest present in the obtained output matrix; and
create one or more output images, wherein each output image comprises a distinct highlighted feature of interest in the input image.

12. The system of claim 11, further comprising:
an output interface configured to display the one or more output images.

13. The system of claim 1, wherein the feature of interest in the each sample is highlighted when the weight of the tag exceeds a predefined third threshold.

14. A computer-implemented method comprising:

sliding, by a processor, a first window, a second window and a third window in a predefined path simultaneously on each training image of a training data set, a binary image containing a highlighted region of interest of the each training image, and a labeled image containing a plurality of tags representing one or more features of interest of the each training image;

obtaining, by the processor, a target matrix for each sample of the labeled image of the each training image contained within the third window during the sliding whenever the second window exists completely within the region of interest of the binary image of the each training image; wherein the target matrix comprises a weighted probabilistic distribution of the plurality of tags, and wherein a weight of a tag in the target matrix is based on a proportion of existence of a feature of interest represented by the tag in the each sample; and training, by the processor, the CNN to recognize the each sample of the each training image to contain a proportion of at least one feature of interest based on a weighted representation of the at least one feature of interest in the target matrix associated with the each corresponding sample of the labeled image.

15. The computer-implemented method of claim 14, further comprises:
providing, by the processor, each sample of the each training image contained within the first window along with a target matrix associated with each corresponding sample of the labeled image of the each training image as a training input to the CNN, whenever the second window exists completely within the region of interest of the binary image of the each training image.

16. The computer-implemented method of claim 14, wherein the plurality of tags comprises a plurality of whole numbers.

17. The computer-implemented method of claim 14, wherein obtaining the target matrix further comprises:
assigning, by the processor, a total weight of the target matrix to a tag when an area covered by a feature of interest represented by the tag in the third window is above a predetermined first threshold.

18. The computer-implemented method of claim 14, wherein obtaining the target matrix further comprises:
assigning, by the processor, a weight to a tag equal to a proportion of area covered by a feature of interest represented by the tag in the third window when the proportion of area covered is above a predetermined second threshold; and
assigning, by the processor, a balance weight to a null tag, wherein the balance weight is a summation of weights of remaining tags of the target matrix wherein each feature of interest represented by each remaining tag covers a proportion of area less than the predetermined second threshold.

19. The computer-implemented method of claim 14, further comprising:
receiving, by the processor, the training data set comprising a plurality of training images;
creating, by the processor, the binary image containing the highlighted region of interest from the each training image using a connected region approach, wherein the binary image is a single bit monochrome image and wherein the region of interest (ROI) is an enclosed space containing the one or more of features of interest and a remaining part of the binary image excluding the ROI comprises background information that is excluded during the training; and
replacing, by the processor, each pixel in the binary image enclosed by the ROI with a single bit and the remaining part with another single bit.

20. The computer-implemented method of claim 14, further comprising:
obtaining, by the processor, a copy of the each training image;
enabling, by the processor, marking a boundary for a portion existing within the copy of the each training image, wherein a portion comprises of at least one feature of interest; and
creating, by the processor, the labeled image of the each training image by replacing each pixel in each portion by a tag representing a feature of interest included within the each portion, and replacing each pixel in a remaining portion of the each training image that is excluded from the each portion by a null tag.

21. The computer-implemented method of claim 14, further comprising:
downsizing, by a processor, the each training image, the binary image of the each training image and the labeled image of the each training image to a plurality of downsized images having successively reducing dimensions where a dimension of a downsized image is not less than a dimension of the first window, when the CNN is trained on the each sample of the each training image of an original size;
sliding, by a processor, a first window, a second window and a third window in a predefined path simultaneously on a downsized training image, a downsized binary image and a downsized labeled image having a predefined reduced dimension, respectively;
obtaining, by a processor, a target matrix for each sample of the downsized labeled image contained within the third window during the sliding, the target matrix comprising a weighted probabilistic distribution of the plurality of tags, wherein the weights of the plurality of tags is based on a proportion of existence of the one or more features in the each sample;
providing, by a processor, a sample of the downsized training image contained within the first window along with a target matrix associated with a corresponding sample of the downsized labeled image contained within the third window as a training input to the CNN whenever the second window exists completely within the region of interest of the downsized binary image; and
training, by the processor, the CNN to recognize the each sample of the downsized training image to contain a proportion of at least one feature of interest based on a weighted representation of the at least one feature in the target matrix associated with the each corresponding sample of the downsized labeled image.

22. The computer-implemented method of claim 21, wherein the downsizing the each training image and the each labeled image enables capturing a feature of interest in whole and a tag associated with the feature of interest within the first window and the third window respectively, and training the CNN on an entire shape and contour of the feature of interest.

23. The computer-implemented method of claim 14, wherein the first window, the second window and the third window have identical dimensions of n*n pixels.

24. The computer-implemented method of claim 14, further comprising:
provisioning, by a processor, an input image to the trained CNN;
obtaining, by the processor, an output matrix containing a probability distribution of a plurality of tags for each sample of the input image that lies within a highlighted region of interest as an output from the trained CNN;
highlighting, by the processor, a feature of interest in the each sample of the input image based on a weight of a tag representing the feature of interest present in the obtained output matrix; and
creating, by the processor, one or more output images, wherein each output age comprises a distinct highlighted feature of interest in the input image.

25. The computer-implemented method of claim 24, wherein the feature of interest in the each sample is highlighted when the weight of the tag exceeds a predefined third threshold.

26. The computer-implemented method of claim 14, wherein the at least one feature of interest comprises at least one of a particular body part, a biological specimen, a specific pattern, and a specific shape based on a type of the training data set.

\* \* \* \* \*